No. 796,709. PATENTED AUG. 8, 1905.
A. S. CORNET.
FISHING NET.
APPLICATION FILED JAN. 6, 1905.
2 SHEETS—SHEET 1.
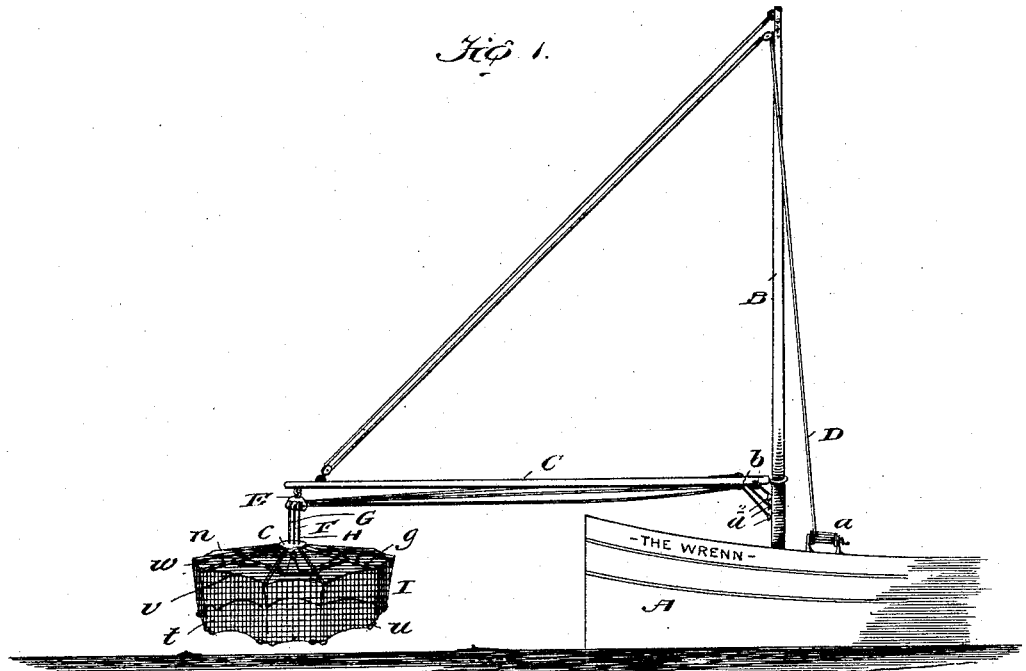
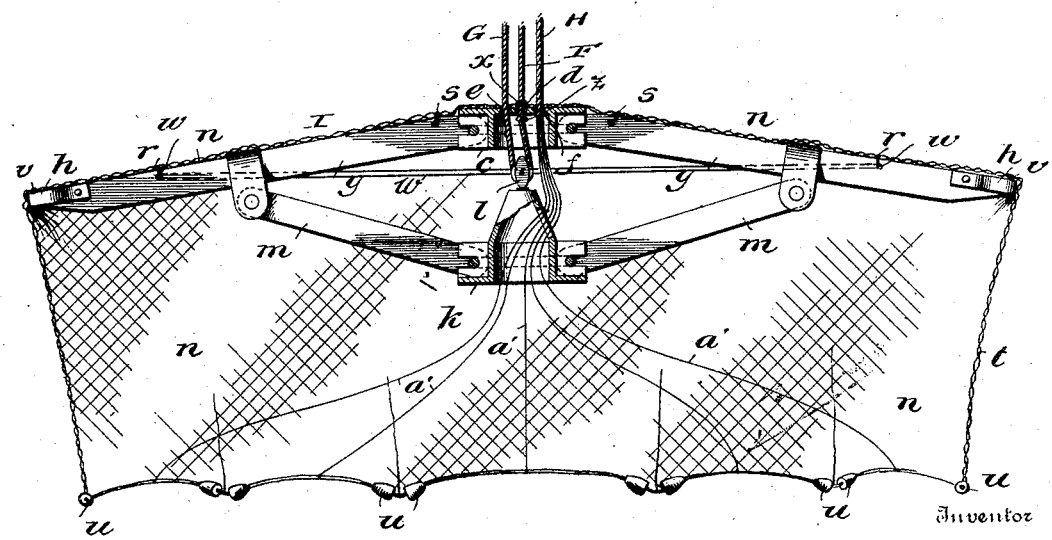

No. 796,709. PATENTED AUG. 8, 1905.
A. S. CORNET.
FISHING NET.
APPLICATION FILED JAN. 6, 1905.
2 SHEETS—SHEET 2.
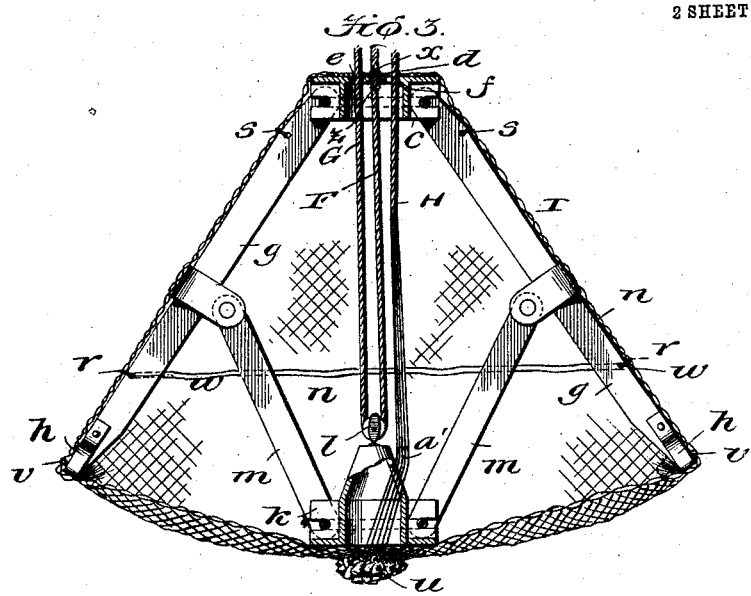
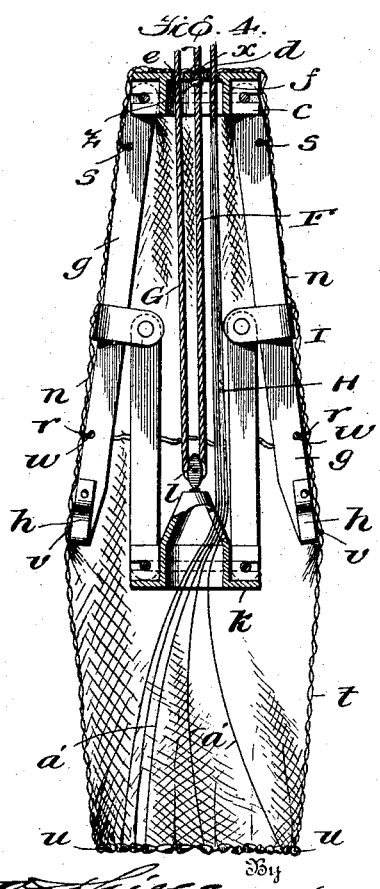

UNITED STATES PATENT OFFICE.

ARTHUR S. CORNET, OF NEW ORLEANS, LOUISIANA.

FISHING-NET.

No. 796,709.  Specification of Letters Patent.  Patented Aug. 8, 1905.

Application filed January 6, 1905. Serial No. 239,909.

*To all whom it may concern:*

Be it known that I, ARTHUR S. CORNET, a citizen of the United States, residing at New Orleans, in the parish of Orleans and State of Louisiana, have invented new and useful Improvements in Fishing-Nets, of which the following is a specification.

My invention pertains to fishing-nets; and it has for its object to provide a cast-net of such construction that it is adapted to be collapsed to facilitate the discharge of its contents, opened or expanded for the entry of fish, and pursed to secure the catch of fish, and this with but a minimum amount of effort on the part of a single operator.

Other objects and advantages of the invention will be fully understood from the following description and claims when taken in connection with the accompanying drawings, forming part of this specification, in which—

Figure 1 is a view illustrating a portion of a vessel and the net constituting the present and preferred embodiment of my invention in proper relation to the vessel, the net *per se* being shown as opened and ready to be lowered into the water. Fig. 2 is a diametrical section of the net as the same appears when fully opened and adapted to be lowered over a school of fish at the bottom of a body of water. Fig. 3 is a view similar to Fig. 2, showing the net with its bottom pursed to secure a catch of fish. Fig. 4 is a diametrical section of the net as it appears when collapsed.

Similar letters designate corresponding parts in all of the views of the drawings, referring to which—

A is a vessel provided with an upright B, which may, if desired, be a mast.

C is a vertically and horizontally swinging boom connected to the upright B.

D is a cable for manipulating the boom, which cable is preferably connected to the upper portion of the upright B and is passed through a block on the outer portion of the boom and another block on the upper portion of the upright and is adapted to be connected to a windlass $a$ on the deck of the vessel or otherwise secured.

E is a triple block—i. e., a block having three sheaves—carried at the outer end of the boom C.

F, G, and H are cables passed over the sheaves of the block E and through suitable guides $b$ on the inner portion of the boom and designed to enable an operator on the vessel to suspend, open, or expand and purse my improved net, and I is the said net as a whole.

In the present and preferred embodiment of my invention the net I is made up of a notched head $c$, having three apertures $d$, $e$, and $f$ for the passage of the cables F, G, and H, respectively; ribs $g$, pivoted in the notches of the head $c$, so as to swing vertically and terminating at their outer ends in loops $h$; a vertically-movable central notched block $k$ of annular form; a pulley-block $l$, connected to and arranged above the notched block $k$; braces $m$, pivoted in the notches of the block $k$ and pivotally connected at their outer ends to the ribs $g$; netting $n$, arranged over the head $c$ and the ribs $g$ and connected to the latter at the points $r$ and $s$ and terminating in an annular skirt $t$, which depends from the outer ends of the ribs $g$; weights $u$, connected to the skirt of the netting and arranged at intervals in the length of the edge thereof; a cable $v$, extending through the loops at the outer ends of the ribs $g$ and having for its function to support the portions of netting intermediate said ends, and a cable $w$, extending through the ribs $g$ at intermediate points in the length thereof and designed to assist in the support of the netting $n$.

The cable F is designed to enable the operator on the vessel A to raise or lower the net in an opened state, and it is passed through the aperture $d$ in the head $c$ and is provided above and below said head with enlargements $x$ $z$, preferably knots, as illustrated. The cable G, through the medium of which the operator on the vessel is enabled to expand or open the net, preferably forms a continuation of the cable F below the lower knot $z$ and is passed through the pulley-block $l$ and thence upwardly through the aperture $e$ in the head $c$. The remaining cable H is designed to enable the operator on the deck of the vessel to purse the skirt or lower portion of the netting, so as to retain a catch of fish in the net incident to the raising of the net and the moving of the same to a position above the vessel. Said cable H comprises a plurality of independent strands or ropes $a'$, and these latter extend downwardly through the aperture $f$ in the head $c$ and also through the annular notched block $k$ and thence outwardly and are connected at their outer ends to the edge of the netting-skirt $t$, as best shown in Fig. 2 of the drawings.

In the practical use of my improvements it will be observed that when the net is suspended on the cable F and the operator desires to open or expand the net, as when the net is to be lowered below the surface of the water, it is simply necessary for the operator to draw upon the cable G, for when this is done the notched block $k$ will be raised, and hence the ribs $g$ will be forced outwardly and upwardly into the position shown in Fig. 2, through the medium of the braces $m$. With the net in its open or expanded state it is obvious that it may be lowered over a school of fish at the bottom of a body of water and also that it may be handled with facility in deep or shallow water and in calm or stormy weather. Subsequent to the fish entering the net the operator on the deck of the vessel has but to relax the cable G and draw upon the cable H, when, as will be readily observed, the bottom or skirt of the netting will be pursed, as shown in Fig. 4, and the net, with the fish securely retained therein, may be raised from the water and swung to a position over the vessel, and when it reaches the latter position the operator has but to relax the cables G and H in order to dump the catch of fish into the vessel.

It will be apparent from the foregoing that if the operator so elects he may lower the net into the water while the net is in a collapsed or closed state. I have found, however, that it is preferable in practice to lower the net into the water while the net is in an open state, this with a view of avoiding frightening any fish that may be in the immediate vicinity.

As before stated, my novel net may be handled with facility by a single operator and yet as many fish may be caught with the same as with an ordinary seine, which latter can only be operated in shallow water and which requires a number of men to do the work. It will also be appreciated that a catch may be made with my novel net in about thirty minutes, while the hauling of a seine of approximately the same capacity requires about three hours, and, further, that there is no liability of my novel net breaking except under the strain of its contents.

I have entered into a detailed description of the construction and relative arrangement of the parts embraced in the present and preferred embodiment of my invention in order to impart a full, clear, and exact understanding of the said embodiment. I do not desire, however, to be understood as confining myself to the said specific construction and relative arrangement of parts, as such changes or modifications may be made in practice as fairly fall within the scope of my invention as claimed.

While my novel device is designed more especially for use as a fishing-net, it is not limited to such use, inasmuch as it may be employed to advantage in the raising of an object at the bottom of a body of water—such as treasure, a corpse, and weeds—and may also be employed to advantage in the lowering and positioning of piles, rock, mattresses, and the like on the bottom.

Having described my invention, what I claim, and desire to secure by Letters Patent, is—

1. A net comprising a collapsible frame, netting carried by and depending from said collapsible frame, and means for closing the depending portion of the netting so as to retain a catch of fish in the net.

2. A net comprising a collapsible frame, means for opening said frame, netting arranged on the frame and having a skirt depending from the same, and means connected to the edge of the skirt for pursing said skirt.

3. A net comprising a collapsible frame, a cable for suspending the frame, netting arranged on the frame and having a skirt depending from the same, a cable for opening the frame, and ropes connected to the edge of the skirt for pursing said skirt and also connected to a cable.

4. In a net, the combination of a frame comprising a head, ribs connected to and extending outwardly from the head, a vertically-movable block, and braces interposed between and connected to the ribs and said block, netting arranged on the frame and having a weighted skirt depending from the same, a cable for suspending the frame, a cable for opening the frame, and ropes connected to the edge of the skirt for pursing said skirt.

5. In a net, the combination of a frame comprising a head, ribs connected to the head, a vertically-movable, annular block and braces interposed between and connected to the ribs and said block, netting arranged on the frame and having a weighted skirt depending from the same, a pulley-block connected to and movable with the vertically-movable block, a cable passed through the head and having enlargements above and below the same, a cable forming a continuation of the first-mentioned cable and passed through the pulley-block and thence upwardly through the head, ropes connected to the edge of the skirt and passed through the annular block and upwardly through the head, and a cable forming a continuation of the said ropes.

6. The combination of a vessel provided with an upright and a boom on said upright, a cable connected to the boom and arranged for the manipulation of the same, a net comprising a collapsible frame, netting arranged on the frame, and a weighted skirt depending from the netting, a suspending-cable connected to the frame and extending through guides on the boom to the vessel, a cable for opening the frame also extending through guides on the boom and to the vessel, means for pursing the skirt of the netting, and a cable connected to said means and passed through guides on the boom to the vessel.

In testimony whereof I have hereunto set my hand in presence of two subscribing witnesses.

ARTHUR S. CORNET.

Witnesses:
   GEO. W. KENDALL,
   LOUIS P. BRYANT.